US012578087B2

(12) United States Patent
McCune et al.

(10) Patent No.: US 12,578,087 B2
(45) Date of Patent: Mar. 17, 2026

(54) PORTABLE MOVEMENT ACTIVATED LIGHTING SYSTEM

(71) Applicant: Alliance Sports Group, L.P., Roanoke, TX (US)

(72) Inventors: Clark McCune, Roanoke, TX (US); Todd Lee Marcucci, Mansfield, TX (US)

(73) Assignee: Alliance Sports Group, L.P., Roanoke, TX (US)

(*) Notice: Subject to any disclaimer, the term of this patent is extended or adjusted under 35 U.S.C. 154(b) by 0 days.

(21) Appl. No.: 19/048,122

(22) Filed: Feb. 7, 2025

(65) Prior Publication Data

US 2025/0257868 A1 Aug. 14, 2025

Related U.S. Application Data

(60) Provisional application No. 63/551,863, filed on Feb. 9, 2024.

(51) Int. Cl.

| | |
|---|---|
| ***F21V 23/04*** | (2006.01) |
| ***F21L 4/00*** | (2006.01) |
| ***F21V 21/40*** | (2006.01) |
| *F21Y 115/10* | (2016.01) |

(52) U.S. Cl.

CPC ............ *F21V 23/0471* (2013.01); *F21L 4/00* (2013.01); *F21V 21/406* (2013.01); *F21V 23/0414* (2013.01); *F21Y 2115/10* (2016.08)

(58) Field of Classification Search

CPC ............... F21V 23/0471; F21V 21/406; F21V 23/0414; F21L 4/00; F21Y 2115/10

See application file for complete search history.

(56) References Cited

U.S. PATENT DOCUMENTS 5,424,928 A * 6/1995 Jordan ................ F21V 37/0075 362/180
5,469,346 A 11/1995 Haut et al.
(Continued)

FOREIGN PATENT DOCUMENTS

CN 101479524 A 7/2009
CN 204014833 U 12/2014
(Continued)

OTHER PUBLICATIONS

PCT Application No. PCT/US25/14974 filed Feb. 7, 2025, Clark McCune, International Search Report Mailing Date of Apr. 4, 2025; 2 pages.

(Continued)

*Primary Examiner* — Bao Q Truong

(74) *Attorney, Agent, or Firm* — Thorpe North & Western, LLP.; Jed H. Hansen

(57) ABSTRACT

A light assembly is disposed about a core that is slidably and rotatably coupled to a frame. The frame has an interior volume that is shaped to receive the core therein. When the core is disposed within the frame, the light assembly is visible through the frame. In this manner, light propagated from the light assembly is propagated through an opening in the frame. The core can be moved longitudinally with respect to the frame and/or radially with respect to the frame. Light output increases as the core is moved with respect to the frame.

20 Claims, 6 Drawing Sheets

(56) References Cited

U.S. PATENT DOCUMENTS

| | | | | |
|---|---|---|---|---|
| 5,758,949 | A * | 6/1998 | Van Deursen | F21V 17/007 362/186 |
| 6,055,766 | A | 5/2000 | Nolan | |
| 6,134,826 | A | 10/2000 | Mah | |
| 6,305,820 | B1 * | 10/2001 | Poon | F21V 23/0414 362/372 |
| 7,360,921 | B1 | 4/2008 | Greenspon | |
| 7,497,590 | B2 | 3/2009 | Rains, Jr. et al. | |
| 7,517,107 | B2 | 4/2009 | Dallas et al. | |
| 7,621,653 | B2 | 11/2009 | Hendrie | |
| 7,682,037 | B1 | 3/2010 | Hose et al. | |
| 7,988,318 | B1 | 8/2011 | Smith et al. | |
| 8,113,681 | B2 | 2/2012 | Dallas et al. | |
| 8,491,151 | B2 | 7/2013 | Spartano | |
| 8,638,074 | B2 | 1/2014 | Babcock et al. | |
| 9,410,879 | B1 | 8/2016 | Hose | |
| 10,188,091 | B2 | 1/2019 | Horne | |
| 10,393,325 | B2 * | 8/2019 | Oh | G08B 17/00 |
| 10,701,923 | B2 * | 7/2020 | Horne | A01M 1/04 |
| 11,076,460 | B2 | 7/2021 | Prieto | |
| 11,516,897 | B2 | 11/2022 | Horne | |
| 11,543,110 | B2 | 1/2023 | Prieto | |
| 11,796,140 | B1 | 10/2023 | Kluck | |
| 2002/0047009 | A1 | 4/2002 | Flugstad et al. | |
| 2002/0139984 | A1 | 10/2002 | Sugawara | |
| 2004/0057232 | A1 | 3/2004 | Poon | |
| 2004/0070352 | A1 | 4/2004 | Shen | |
| 2006/0237636 | A1 | 10/2006 | Lyons et al. | |
| 2006/0262526 | A1 | 11/2006 | Dubois | |
| 2007/0146958 | A1 | 6/2007 | Babcock et al. | |
| 2007/0159008 | A1 | 7/2007 | Bayat et al. | |
| 2007/0188114 | A1 | 8/2007 | Lys | |
| 2008/0034642 | A1 | 2/2008 | Chen | |
| 2009/0189548 | A1 | 7/2009 | Hoffman | |
| 2009/0190338 | A1 | 7/2009 | Huang | |
| 2011/0121654 | A1 | 5/2011 | Recker | |
| 2011/0133655 | A1 | 6/2011 | Recker | |
| 2011/0148318 | A1 | 6/2011 | Shackle | |
| 2011/0157942 | A1 | 6/2011 | Babcock | |
| 2012/0080944 | A1 | 4/2012 | Recker | |
| 2012/0212963 | A1 | 8/2012 | Jigamian | |
| 2013/0165226 | A1 | 6/2013 | Thorner | |
| 2014/0062298 | A1 | 3/2014 | Brockett | |
| 2014/0062299 | A1 | 3/2014 | Brockett et al. | |
| 2014/0140050 | A1 | 5/2014 | Wong et al. | |
| 2015/0009660 | A1 | 1/2015 | Lee | |
| 2015/0167937 | A1 | 6/2015 | Casper | |
| 2016/0101227 | A1 | 4/2016 | Norris | |
| 2016/0286613 | A1 | 9/2016 | Bayat | |
| 2016/0330825 | A1 | 11/2016 | Recker | |
| 2016/0348880 | A1 | 12/2016 | Galli et al. | |
| 2017/0002994 | A1 | 1/2017 | Fisher et al. | |
| 2017/0094744 | A1 | 3/2017 | Chen | |
| 2017/0094960 | A1 | 4/2017 | Sasaki et al. | |
| 2017/0181244 | A1 | 6/2017 | Shur et al. | |
| 2017/0208661 | A1 | 7/2017 | Hussain | |
| 2017/0223807 | A1 | 8/2017 | Recker | |
| 2018/0106616 | A1 | 4/2018 | Jiang | |
| 2018/0147386 | A1 | 5/2018 | Sato | |
| 2018/0194021 | A1 | 7/2018 | Nguyen | |
| 2018/0198036 | A1 | 7/2018 | Horie | |
| 2018/0312105 | A1 | 11/2018 | Bartell et al. | |
| 2018/0343846 | A1 | 12/2018 | Horne | |
| 2019/0150249 | A1 | 5/2019 | Bertken et al. | |
| 2019/0313500 | A1 | 10/2019 | Stevens, Jr. et al. | |
| 2019/0387732 | A1 | 12/2019 | Horne | |
| 2020/0175247 | A1 | 6/2020 | Weaver et al. | |
| 2021/0360756 | A1 | 11/2021 | Gadegaard | |
| 2023/0171859 | A1 | 6/2023 | Horne | |
| 2024/0057239 | A1 | 2/2024 | Marcucci | |
| 2024/0114606 | A1 | 4/2024 | Prieto | |

FOREIGN PATENT DOCUMENTS

| | | | |
|---|---|---|---|
| CN | 104832808 | A | 8/2015 |
| CN | 108468975 | A | 8/2018 |
| CN | 209294981 | U | 12/2019 |
| CN | 209819400 | U | 12/2019 |
| CN | 216924262 | U | 7/2022 |
| EP | 2158141 | | 5/2013 |
| GB | 2540530 | A | 1/2017 |
| KR | 20090054653 | A | 6/2009 |
| KR | 20-2013-0006888 | U | 12/2013 |
| KR | 10-1545083 | B1 | 8/2015 |
| KR | 10-1711395 | | 3/2017 |
| KR | 101711395 | B1 | 3/2017 |
| WO | WO 2008/156594 | | 12/2008 |
| WO | WO 2018/222992 | | 12/2018 |
| WO | WO 2024/040005 | | 8/2023 |

OTHER PUBLICATIONS

LitezAll, "LitezAll Pull Up Lantern with Built-In Fan" product website & specifications, Jun. 29, 2021, p. 1-6.

Coleman, "Coleman Divide Twist 500 Lumens LED Lantern", Forest City Surplus Canada, product website & specifications, Jul. 4, 2022, p. 1-3.

Vont, "Vont LED Camping Lantern", product website & specifications, Nov. 28, 2021, p. 1-17.

Barebones, "Beacon Hanging Light" product website & specifications, Oct. 31, 2016, p. 1-8.

Etekcity, "Etekcity 4 Pack Portable Lantern with 12 AA Batteries (Black, Collapsible)", Amazon.in, product website & specifications, Jul. 7, 2017, p. 1-6.

Bell+Howell, "Bell + Howell Tacklight Collapsable Portable Camping and Outdoor Lantern", JCPenney, product website & specifications, Aug. 11, 2022, p. 1-4.

XTAUTO, "Collapsible Portable LED Camping Lantern XTAUTO Lightweight Waterproof Solar USB Rechargeable LED Flashlight Survival Kits for Indoor Outdoor Home Emergency Light Power Outages Hiking Hurricane 4-Pack", Amazon.in, product website & specifications, May 20, 2021 p. 1-5.

PCT Application No. PCT/US2023/072101 filing date Aug. 11, 2023, Todd Lee Marcucci, International Search Report Mailing Date Dec. 14, 2023; 4 pages.

International Search Report issued 24 Sep. 2018, in International Application No. PCT/US18/35599, filed Jun. 1, 2018; 16 pages.

* cited by examiner

PORTABLE MOVEMENT ACTIVATED LIGHTING SYSTEM

PRIORITY CLAIM

The present application claims priority to U.S. Ser. No. 63/551,863 filed Feb. 9, 2024 entitled "Portable Movement Activated Lighting System" which is incorporated herein by reference in its entirety.

BACKGROUND

Lighting devices are commonly used appliances in numerous applications where different lighting applications are desired. Aspects of the technology improve upon the state of the art by providing unique alternatives to increasing light output on a portable lighting device.

BRIEF DESCRIPTION OF THE DRAWINGS

To further clarify the above and other aspects of the present technology, a more particular description of the invention will be rendered by reference to specific aspects thereof which are illustrated in the appended drawings. It is appreciated that these drawings depict only typical aspects of the technology and are therefore not to be considered limiting of its scope. The drawings are not drawn to scale. The technology will be described and explained with additional specificity and detail through the use of the accompanying drawings in which.

DESCRIPTION OF ASPECTS OF TECHNOLOGY

Figure 1B:
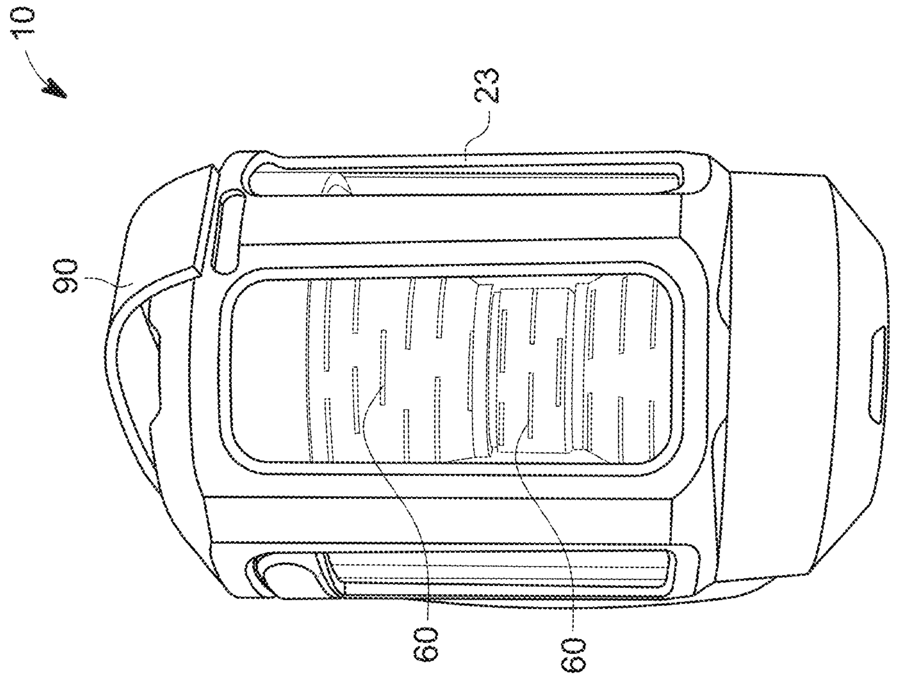
FIG. 1B is a perspective view of a lighting device in a closed axial position in accordance with one aspect of the technology.

Although the following detailed description contains many specifics for the purpose of illustration, a person of ordinary skill in the art will appreciate that many variations and alterations to the following details can be made and are considered to be included herein. Accordingly, the following aspects are set forth without any loss of generality to, and without imposing limitations upon, any claims set forth. It is also to be understood that the terminology used herein is for the purpose of describing particular aspects only, and is not intended to be limiting. It is also understood that different aspects of the technology may be combined with other aspects as suits a particular purpose. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

Example Embodiments

An initial overview of technology embodiments is provided below and specific technology embodiments are then described in further detail. This initial summary is intended to aid readers in understanding the technology more quickly but is not intended to identify key or essential features of the technology. Nor is the initial summary intended to limit the scope of the claimed subject matter.

Broadly speaking, aspects of the disclosed technology create an improved lighting device that varies lumen output as parts of the lighting device are moved with respect to other parts of the lighting device. In one aspect of the technology, a light assembly is disposed about a core that that is slidably and rotatably coupled to a frame. The frame comprises an interior volume that is shaped to receive the core therein. When the core is disposed within the frame, the light assembly is visible through the frame. In this manner, light propagated from the light assembly is propagated through an opening in the frame and/or, in one aspect, a transparent or translucent portion of the frame.

In one aspect, as the core is moved longitudinally (i.e., about a longitudinal axis or axially) with respect to the frame, the output from the light assembly is increased. In another aspect, as the core is moved radially with respect to the frame, the output from the light assembly is increased. This may be accomplished by either increasing the number of LEDs in the light assembly that are propagating light, increasing the voltage supplied to the LEDs, and/or by increasing the duty cycle of the LEDs in the light assembly.

In another aspect, the light assembly comprises one or more LEDs disposed radially and/or horizontally about the core. As the core is moved radially and/or longitudinally with respect to the frame, the output from the light assembly is increased radially and/or longitudinally. For example, when moved from a beginning (or OFF) position to a first position, the light output from a first radial section and/or first horizontal section is increased. As the core is rotated from a first to a second position, the light output from a second radial section and/or a second horizontal section is increased. This process may be continued as desired by a user until light is propagated from approximately the entire core. In this manner, lighting is sequentially activated in a radial and/or longitudinal direction and/or increased in output in a radial and/or longitudinal direction.

More specifically, in one aspect of the technology, a light assembly disposed about the core comprises a plurality of LEDs arranged horizontally and vertically about all lateral sides of the core. The LEDs are configured to have an increased power output in a horizontal direction as the core is rotated with respect to the frame. In an aspect where the lighting assembly is annular, the LEDs are disposed radially about the core as well as vertically. In a beginning position, all light from the light assembly is OFF. In other words, the beginning position is the OFF position. When moved into a first position, the lighting device is in an ON position and light is propagated from one or more LEDs having the same vertical orientation (e.g., those in a first radial section). In one aspect, the first radial section is configured to propagate light at an approximately 15-degree section (though other radial sections may be used) extending laterally outward from the core. When the core is rotated into a second position, a second radial section (e.g., one or more LEDs having the same vertical orientation) is activated and light from the second radial direction is turned ON. In one aspect, when the first and second radial sections are propagating light, light is being propagated at an approximately 30-degree section extending laterally from the core. In one aspect, the light assembly comprises a plurality of radial sections, each configured to propagate light in sequence as the core, or a portion of the core, is rotated with respect to the frame.

In another aspect of the technology, the LEDs in the light assembly are also configured to increase in light output as the core is moved longitudinally (e.g., upward or downward in an axial direction) with respect to the frame. For example, if the core is disposed within the frame in a first radial position and the core is moved upward with respect to the frame, the LEDs in the first radial section will have an increased light output. In one aspect, the increased light output in the first radial section corresponds to an increase in the number of LEDs activated to propagate light. In another aspect, the increased light output in the first radial section corresponds to an increase in voltage supplied to the LEDs in the first radial section and/or to an increase in the duty cycle of the LEDs in the first radial section. If the core, or a portion of the core, is disposed in a second radial position and the core is moved upward or downward with respect to the frame, light output in both the first and second radial sections is increased. If the core, or a portion of the core, is disposed in a third radial position and the core, or a portion of the core, is moved upward or downward with respect to the frame, light output from the first, second, and third radial sections is increased. In this manner, the increase in light output as the core is moved upward or downward with respect to the frame corresponds to the radial position of the core, or a portion of the core intended to be rotated to activate different radial sections of the light assembly disposed about the core.

While the rotating action has been described as activating radial sections, and the upward/downward movement has been described as increasing light output, it is understood that the effect of those actions may be reversed as suits a particular application. Meaning, the rotating action of the core, or a portion of the core (such as an end of the core) increases the light output in certain aspects of the technology, and the upward/downward movement of the core with respect to the frame activates different radial sections of the light assembly. Likewise, a first portion of the core may be rotated to activate radial sections of the light assembly, and a second portion of the core may be rotated to increase light output from one or more radial sections. Moreover, it is understood that moving the core in a reverse direction from what it was used to activate the light, may be used to deactivate the light. That is, if the core is rotated in a clockwise direction to activate/increase light output, it is rotated counter-clockwise to deactivate/decrease light output. If the core is moved upward with respect to the frame to activate/increase light output, it is moved downward to deactivate/decrease light output.

In addition to activating the light and/or increasing light output, in one aspect of the technology, the longitudinal movement and/or radial movement is used to change the color of light being propagated. In one example, as the core is rotated radially, one or more segments of the light assembly that are propagating light will change from propagating white light to propagating blue, red, yellow, green or any other wavelength of light including, but without limitation, infrared, ultraviolet, or different combinations of the same. In one aspect, the longitudinal movement of core activates and/or increases light output from the light assembly while the radial movement changes the wavelength of light being propagated in different segments. Alternatively, in another aspect, radial movement of the core activates and/or increases light output from the light assembly while longitudinal movement of the core changes the wavelength of light being propagated from the light assembly.

Selective modification of different segments of lights is also contemplated in different aspects of the technology. For example, in one aspect of the technology, longitudinal movement of the core sequentially activates different segments of the light assembly until all of the segments are lighted. In one aspect, radial movement of the core then changes the wavelength of light of one or more segments while maintaining the original wavelength of light of the remaining segment(s). In other aspects, radial movement dims one or more segments of the light assembly while maintaining the brightness of one or more of the remaining segments. Alternative, radial movement of the core increases the brightness of one or more segments while maintaining the brightness of the other segments.

In yet another aspect of the technology, the longitudinal and/or radial movement of the core is used to change the operation settings of the light assembly. For example, in one aspect of the technology, movement of the core with respect to the frame changes the light assembly from directing light in a flood or area pattern to directing light in a spot pattern and vice versa. This change in the pattern of light being propagated may be a hard switch (i.e., immediate change from flood to spot) or, in other aspects of the technology, is a transition wherein the flood pattern decreases in proportion to the increase in the spot pattern.

It is noted that no specific order is required in these methods unless required by the claims set forth herein, though generally, in some aspects, the operational method steps can be carried out sequentially.

Figure 1A:
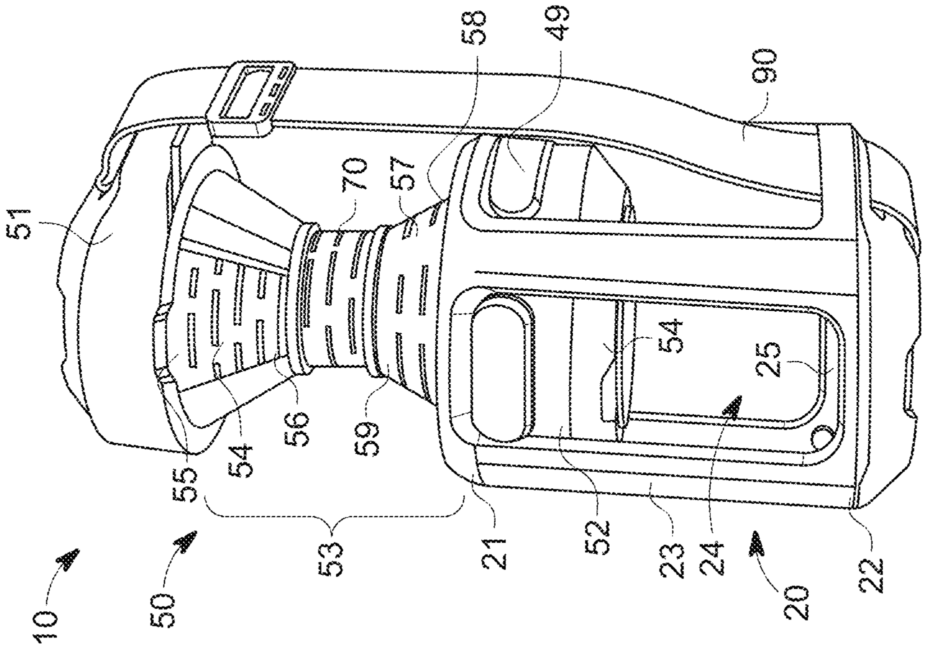
FIG. 1A is a perspective view of a lighting device in an open axial position in accordance with one aspect of the technology.
Figure 2C:
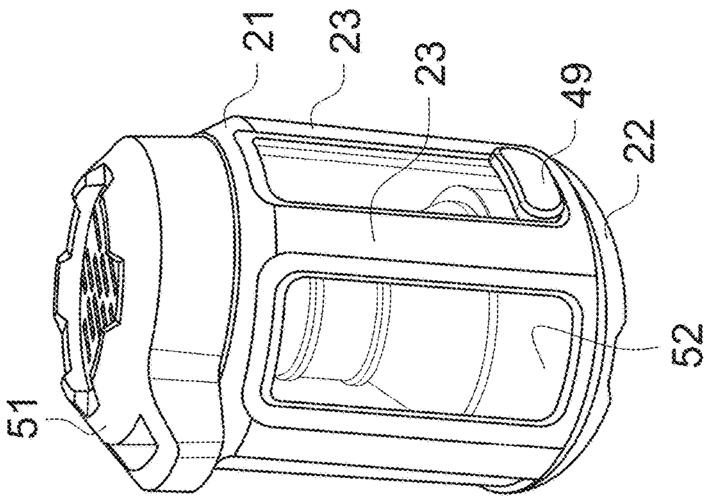
FIG. 2C is a perspective view of lighting devices in a closed axial position in accordance with one aspect of the technology.
Figure 2B:
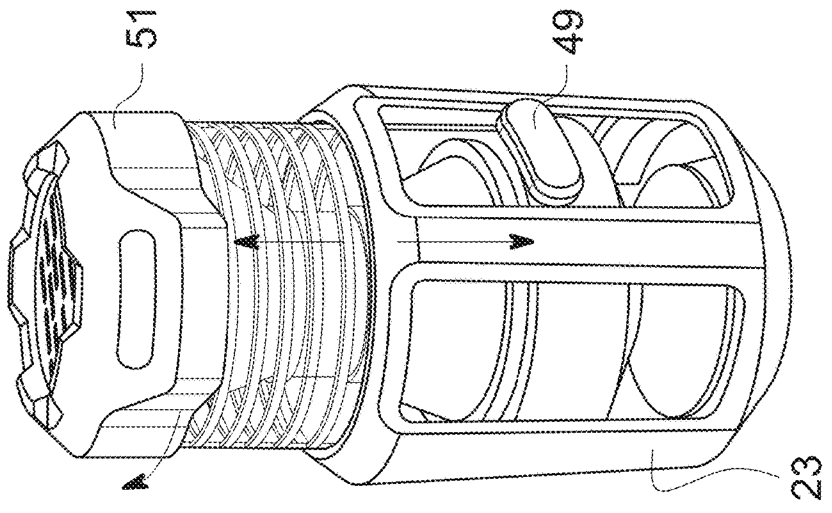
FIG. 2B is a perspective view of a lighting device in a partially open axial position in accordance with one aspect of the technology.
Figure 2A:
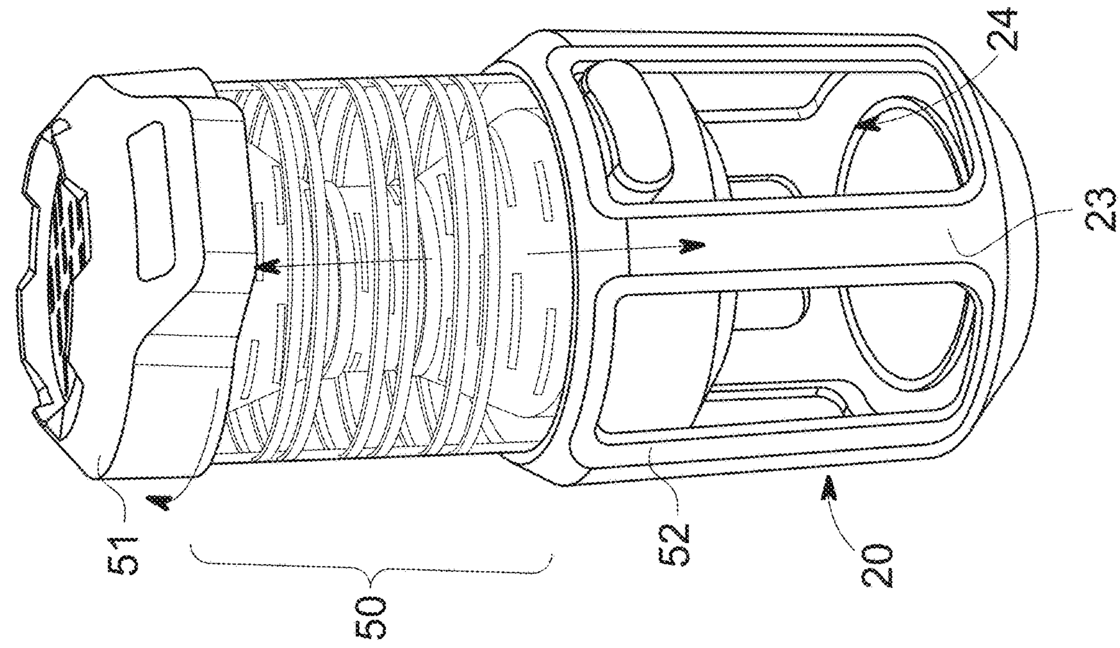
FIG. 2A is a perspective view of a lighting device in an open axial position in accordance with one aspect of the technology.
Figure 3A:
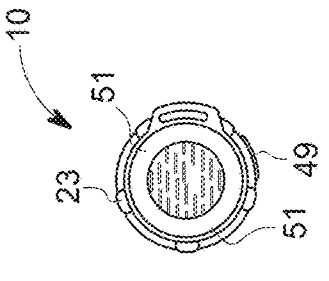
FIG. 3A-3H are top views of a lighting device in different radial positions ranging from completely radially closed to completely radially open in accordance with one aspect of the technology.
Figure 3B:
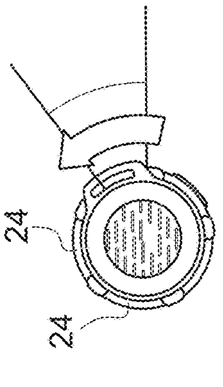
Figure 3C:
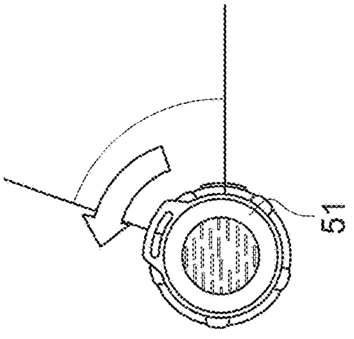
Figure 3D:
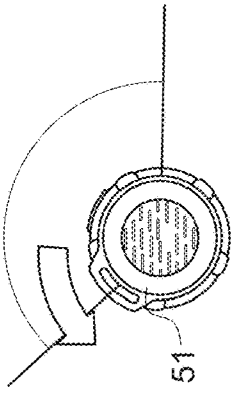
Figure 3E:
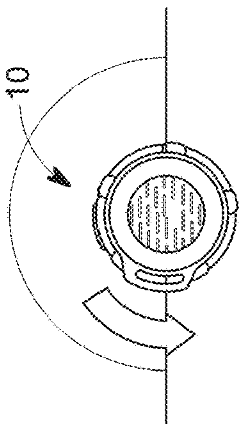
Figure 3F:
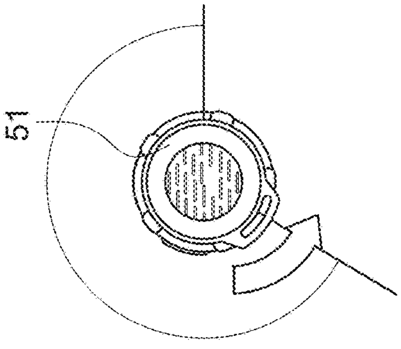
Figure 3G:
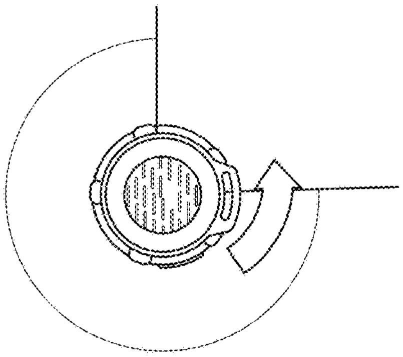
Figure 3H:
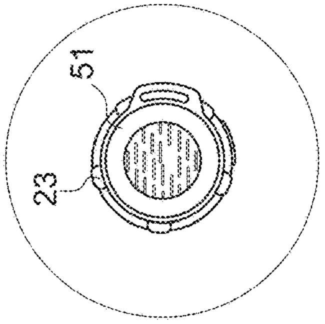
Figure 4:
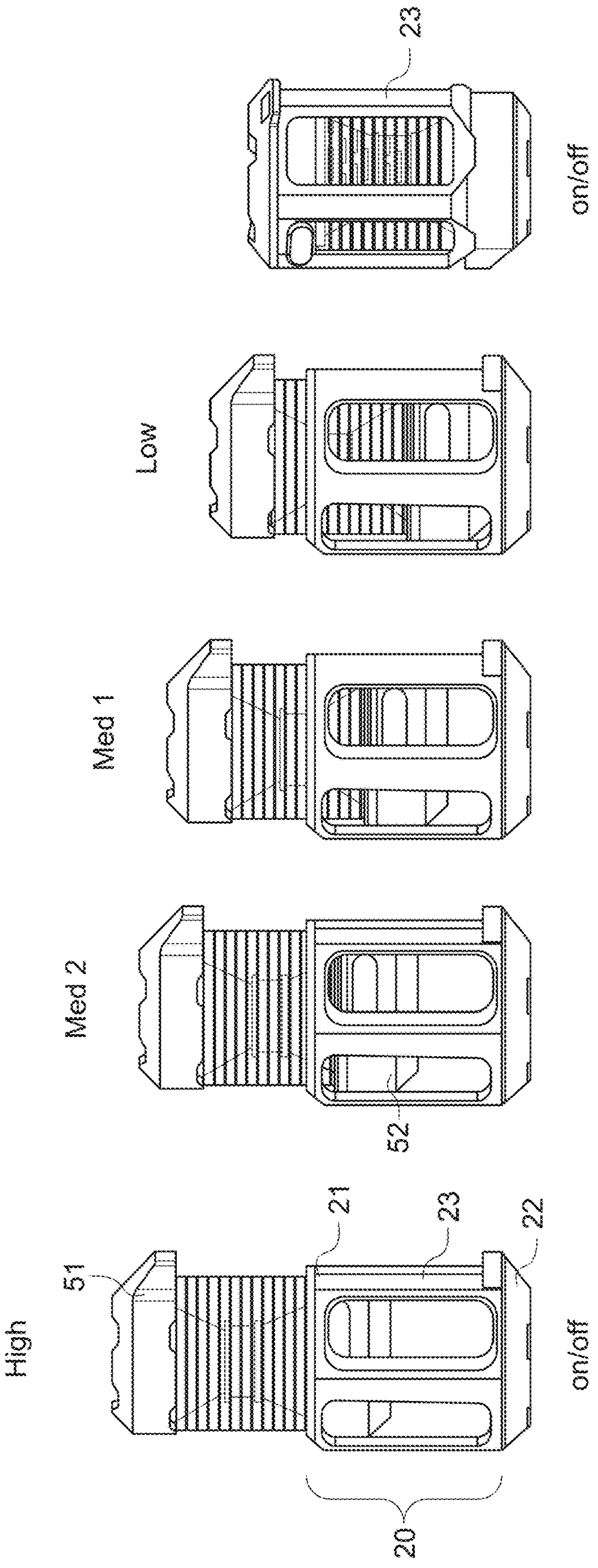
FIG. 4 is a side view of a lighting device in different axial positions ranging from completely closed to completely open in accordance with one aspect of the technology.
Figure 5:
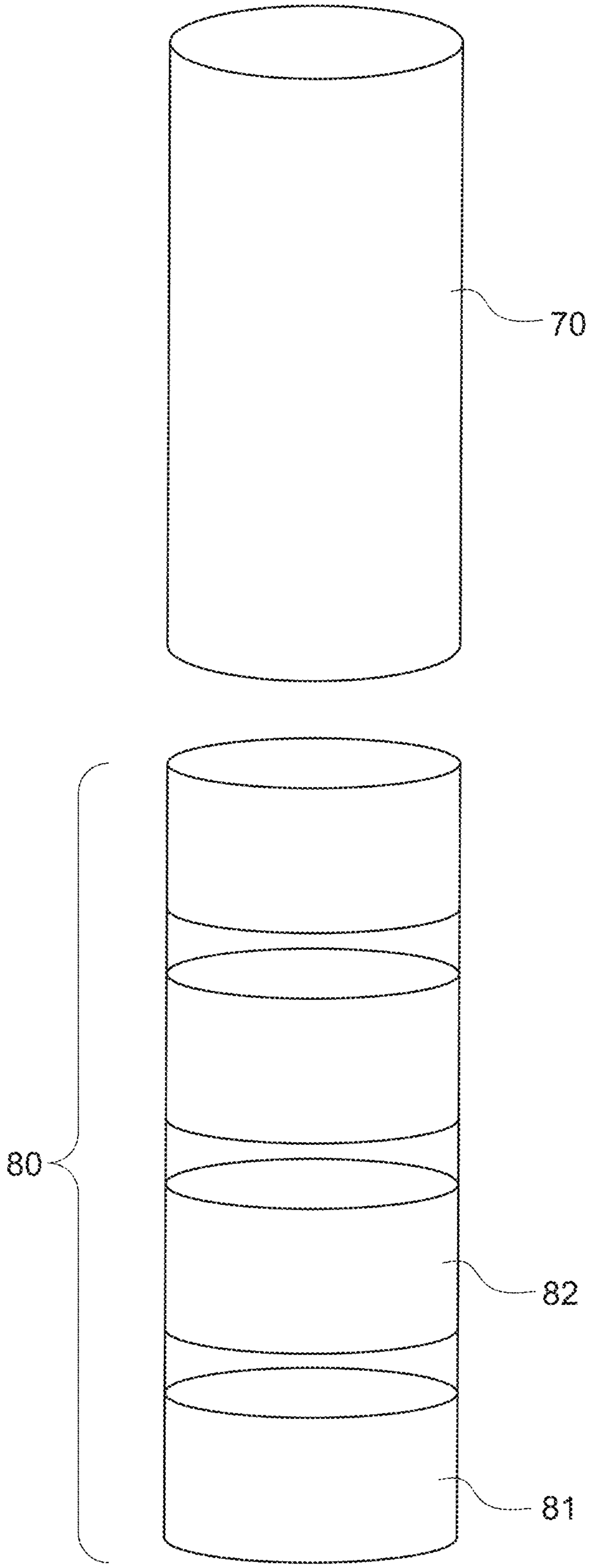
FIG. 5 is a perspective view of a light assembly in accordance with one aspect of the technology.
Figure 6:
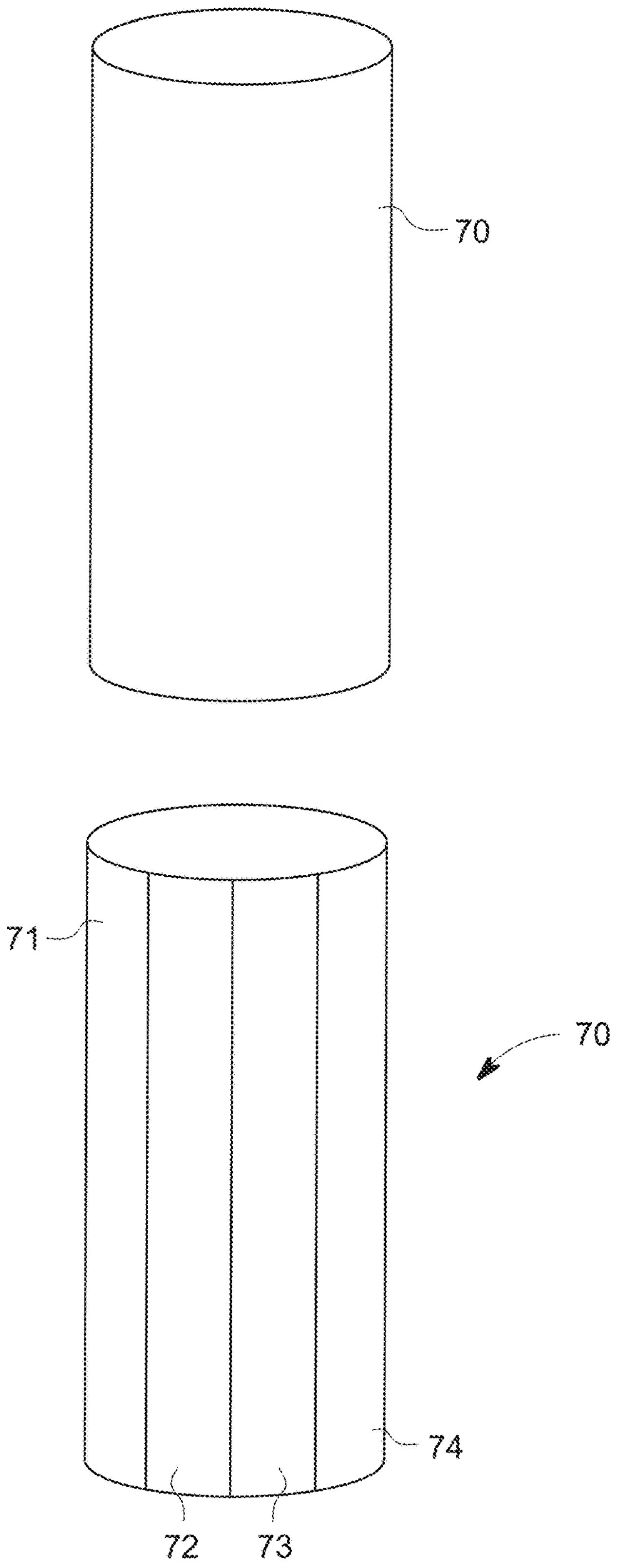
FIG. 6 is a perspective view of a light assembly in accordance with one aspect of the technology.

With reference generally to the figures, FIGS. 1 through 6 illustrate different aspects of a portable lighting device 10. The lighting device 10 generally comprises a frame 20 configured to receive a core 50 therein. The core 50 comprises a cavity for a power source (e.g., a battery) and may include a rechargeable power source. In one aspect, the lighting device 10 comprises one or more power switches and a logic controller such as a programmable logic controller or PLC. A PLC is a digital computer used for automation of certain electromechanical processes. PLCs are designed for multiple arrangements of digital and analog inputs and outputs, extended temperature ranges, immunity to electrical noise, and resistance to vibration and impact. In one aspect of the technology, the instructions to control operation of the lighting device operation are stored in battery-backed-up or non-volatile memory. Memory refers to electronic circuitry that allows information, typically computer data, to be stored and retrieved.

As will be appreciated by one skilled in the art, aspects of the present technology may be embodied as a system, method or computer program product used in connection with a lighting device. Accordingly, aspects of the present technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a random-access memory (RAM), a read-only memory (ROM), an erasable programmable read-only memory (EPROM or Flash memory), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present technology may be written in any combination of one or more programming languages, including an object-oriented programming language such as Java, Visual Basic, SQL, C++ or the like and conventional procedural programming languages, such as the "C" programming language or similar programming languages.

With reference generally to FIGS. 1 through 6, in one aspect of the technology, the light device 10 comprises a frame 20 having a top 21 and a bottom 22 with an inner volume. The top 21 and bottom 22 of the frame are coupled together by longitudinal arms 23 extending from the top 21 to the bottom 22. In one aspect of the technology, adjacent longitudinal arms 23 of the frame 20 define a longitudinal opening 24. In one aspect, the longitudinal arms 23 comprise a translucent or transparent material. One or more of the longitudinal arms 23 comprise a magnet or tab intended to cooperate with a portion of the core 50 to activate a switch for changing modes of operation of the lighting assembly. An internal volume of the frame 20 is configured to receive a portion of the core 50 therein and, in one aspect, almost the entirety of the core 50 therein. In one aspect of the technology, the frame is substantially cylindrical, though other shapes (e.g., rectangular, spherical, etc.) are contemplated herein.

In one aspect of the technology, the core 50 is shaped to be slidably and rotatably disposed within an internal volume of the frame 20. In one aspect of the technology, the core 50 is cylindrical though it may also be rectangular, spherical, etc. as suits a particular purpose. The core 50 comprises a top 51 and a bottom 52 coupled together by a housing 53. The housing 53 comprises a light assembly 70 configured with a plurality of LEDs disposed thereon. With reference generally to FIGS. 1-4 and specifically to 5 and 6, In one aspect, the light assembly 70 comprises a plurality of LEDs disposed about the core 50 in an annular arrangement. Though, as discussed above, other shapes of the core 50 are within the scope of the current technology. As such, a rectangular arrangement, for example, is also contemplated here.

In one aspect of the technology, the annular arrangement of LEDs comprises a plurality of vertical radial sections 71. Each vertical radial section 71 comprises one or more LEDs (or other light sources). In a single radial section 71 that comprises a plurality of LEDs, the LEDs are arranged vertically within the vertical radial section. In one aspect, each radial section 71 is capable of independent operation, though in aspects described herein, each vertical radial section is configured to be operated sequentially beginning with a first section 72, followed by an adjacent second section 73, a third section 74 adjacent the second section 73 and so on.

Each radial section 71 is configured to propagate light in a particular radial range. For example, in one aspect of the technology, the first section is configured to propagate light at about 15 degrees of the entire annular arrangement. However, the first section may also be configured to propagate light that is greater than or less than 15 degrees. For example, the first section may be configured to propagate light ranging from about 10 degrees to about 180 degrees. The sum of the different radial sections comprises approximately 360 degrees so that an entire annular ring of light may be propagated from the lighting device 10. In one aspect of the technology, each of the radial sections have an equal radial measurement. Meaning, if a first section 72 is configured to propagate light at about 15 degrees, the second and third sections (as well as all the other sections) likewise are configured to propagate light at about 15 degrees. However, in another aspect of the technology, the different radial sections 71 do not have identical radial measurements. For example, a first radial section 72 propagates light at approximately 15 degrees and a second radial section 73 propagates light at approximately 30 degrees. In this manner, when the second radial light 73 is activated sequentially with the first radial section, the combined first and second radial sections propagate light in an approximately 45-degree section.

In one aspect of the technology, the lighting device 10 is configured such that the light assembly 70 is in a beginning OFF position. A top 51 or bottom 52 portion of the core comprises a switch that, when activated, sequentially provides power to the radial sections of the light assembly 70, beginning with the first radial section 72 and so on. In one aspect of the technology, the switch comprises a sensor or sensory assembly coupled to the PLC. In one aspect, the sensor assembly detects movement (i.e., rotation or longitudinal movement) of the core 50 with respect to the frame 20 or a top 51 portion or bottom 52 portion of the core 50 with respect to the core 50 itself. In another aspect, a dial or lever is disposed about a top 51 or bottom 52 of the core 50 that, when moved, activates the radial sections of the light assembly 70. For example, when the core 50 (or top 51, bottom 52, or a lever or dial) are moved from a beginning position to a first position, the first radial section 72 is powered ON. When moved to a second position, the second radial section 73 is activated and so forth until all of the radial sections are powered ON. The light device 10 operates the same in a reverse direction. Meaning, when the light device 10 is fully rotated and all of the radial sections are powered ON, the radial sections are powered off when the core 50 (or a portion of the core 50) is rotated in a reverse direction. In other words, if the light had eight radial sections in total, when the core 50 is rotated to the eighth position all the radial sections are ON. Then the core 50 is rotated back to the seventh position, the eighth radial section turns to an OFF position, and so forth until the core 50 is in the beginning position and all the radial sections are in an OFF position. Then the core 50 is fully disposed within the frame 20 (i.e., in an OFF position), the bottom of the core nests or mates with the bottom 22 of the frame 20. Likewise, in the OFF position, the top of the core 50 nests within or mates with the top 21 of frame 20.

In one aspect of the technology, the sensor assembly comprises a Hall sensor with one or more magnets disposed about a portion of the frame 20 configured to cooperate with a conductor disposed about a portion of the core 50, for example the top 51 or bottom 52 of the core 50. In one aspect, the conductor comprises a thin p-type semiconductor such as gallium arsenide (GaAs), indium antimonide (InSb) or indium arsenide (InAs), for example, though other materials may be used as suits a particular purpose. The conductor is coupled to a current passing through the conductor and the direction of the current flow is perpendicular to the magnetic flux lines of the magnet. As the conductor is moved radially with respect to one or more magnets disposed about the frame 20, the charge carriers are deflected by the Lorentz force, producing a difference in electric potential or voltage between two sides of the conductor. In this manner, the voltage generates a signal that is sent to the PLC and is used to actuate the radial sections of the light assembly 70. In one aspect of the technology, a first magnet is used to actuate the first radial section, a second magnet is used to actuate a second radial section and so on. Meaning, when the conductor is moved past the first magnet, the first radial section is activated, when the conductor is moved past the second magnet, the second radial section is activated, and so on. A similar configuration is contemplated for use in connection with the longitudinal or axial movement of the core 50 within the frame 20 and its concomitant change in light out put from the light assembly 70.

In another aspect of the technology, sensors are configured about one or more of the longitudinal arms 23 of the frame 20 to facilitate actuation of different lighting functions as the core 50 is moved longitudinally with respect to the frame 20. In this aspect, one or more magnets are disposed longitudinally about one or more arms 23 of the frame 20 and correspond to a conductor disposed about the core 50. In one aspect of the technology, the light assembly 70 comprises a plurality of horizontally segmented sections 80. As the core 50 is moved longitudinally with respect to the frame 20, the conductor passes by a first magnet and a first horizontal segment 81 is activated. Meaning, the first horizontal segment 81 is powered from an OFF mode to an ON mode when the core 50 is moved from a beginning position to a first position. As the core 50 continues to move longitudinally with respect to the frame 20, additional sequential horizontal segments are activated. For example, in one aspect, as the core 50 is moved from a first position to a second position, a second horizontal segment 82 is activated. In the second position, both the first horizontal segment 81 and the second horizontal segment 82 are activated. This process can continue for as many horizontal segments are present in the light assembly 70. Meaning, when the core 50 is in a third longitudinal position, the first, second, and third horizontal segments are all activated, and so on. The different horizontal segments are likewise sequentially turned to an OFF position when the core 50 is moved in a reverse direction.

While Hall sensors are described herein, it is understood that any sensor capable of detecting the position of a switch, or actuating a switch may be used. For example, in one aspect of the technology, a mechanical switch is disposed about at top 51 or bottom 52 of the core 50 that may be used to actuate different sections (radial and/or horizontal) of the light assembly 70. In another aspect, one or more mechanical switches are disposed on longitudinal arms 23 of the frame 20 to actuate different sections (radial and/or horizontal) of the light assembly as the core 50 is moved (radially and/or longitudinally) with respect to the frame 20.

In another aspect of the technology, the light output (or lumen output) from one or more of the radial sections and/or horizontal sections is adjustable through the radial adjustment, or twisting, and/or the longitudinal movement of the core 50 with respect to the frame 20. In this manner, while different sections may or may not be turned ON, the light output from one or more sections of the light assembly 70 is increased. In this aspect, as the core 50 is moved with respect to the frame 20 in a radial direction or longitudinally with respect to the frame 20, one or more sensors send a signal to the PLC which increases the voltage to one or more radial/horizontal sections and/or increases the duty cycle in one or more radial/horizontal sections. Likewise, the duty cycle is decreased when the core 50 is moved in a reverse direction. Meaning, if the core 50 is fully rotated/extended, and the light assembly 70 is propagating light at the maximum duty cycle for which the assembly 70 is programmed, as the core is rotated and/or moved longitudinally in a reverse direction, the duty cycle is commensurately decreased. In this manner, the duty cycle is reduced with each reverse movement by the same amount that it was increased by the forward movement. In other words, if the duty cycle is increased by 10% when moving from a second position to a third position, for example, then the duty cycle is decreased when moving from the third position back to the second position.

In one aspect, the PLC is configured to regulate the pulse-width-modulation (or PWM) of one or more LEDs at a plurality of different duty cycles in a plurality of different sequences. PWM is one way of regulating the brightness of a light. In one aspect, light emission from the LED is controlled by pulses wherein the width of these pulses is modulated to control the amount of light perceived by the user of the lighting device. When the full direct current voltage runs through an LED, the maximum amount of light is emitted 100% of the time. That is, the LEDs from one or more radial or horizontal sections of the light assembly 70 emit light 100% of the time when in an "ON" mode. With PWM, the voltage supplied to the LEDs can be "ON" 50% of the time and "OFF" 50% of the time so that the LEDs gives off its maximum amount of light only 50% of the time. This is referred to as a 50% duty cycle. In this scenario, if the ON-OFF cycle is modulated fast enough, human eyes will perceive only half the amount of light coming from the LEDs. That is, with such an input on the LEDs, the amount of light given off appears diminished by 50%. While specific reference is made to a 50% duty cycle, the LEDs duty cycle of the light sources described herein may be greater or lesser than 50% as suits a particular purpose. Generally speaking, the human eye does not see an appearance of flicker in lighting with PWM frequency above 60-80 hertz. Aspects of the current technology modulate the PWM frequency in ranges greater than 60-80 hertz.

In one aspect, the PLC, power source, control switch, and different light sources are all operably coupled together. When core 50 (or a portion of the core, such as a radially adjustable top portion) is in a first position, one or more radial/horizontal sections of the light assembly 70 have their duty cycle increased from 0% (or OFF) up to a duty cycle ranging from 10-20%. When the core 50, or a radially adjustable top of the core 50, is rotated (or otherwise placed) into a second radial position, one or more radial or horizontal sections of the light assembly 70 have their duty cycle increase from 10 to 20% up to 30 to 40%. Likewise, when the core 50 is moved longitudinally with respect to the frame 20 into different longitudinal positions, one or more radial or horizontal sections of the light assembly 70 have their duty cycle increase from 10 to 20% up to 30 to 40%. While specific duty cycles have been referenced, it is understood that any number of different duty cycles are contemplated for use herein, so long as the relative movement of the core 50 with respect to the frame 20 (i.e., radially and/or longitudinally as suits a particular purpose) results in an increase or decrease in the duty cycle of the active portion of the light assembly 70, depending on the direction of movement. For example, in one aspect, the duty cycle when the core 50 is moved from OFF to a first position ranges from 35% to 45% and increases in 10% increments with each movement to each new position. In other words, if in the first position, the duty cycle is 40%, the second position would have a duty cycle of 50%, and third, fourth, and fifth positions would have a duty cycle of 60%, 70%, and 80%, respectively. The increase from each respective move may be more or less than 10%. For example, in one aspect, each increase is only 5%, but in other aspects each increase is 15%, 20%, 25%, 30%, 35%, or 40%. In another aspect, when in a first position, the activated section of light assembly 70 has a duty cycle of 20%. With each respective increase in position, the duty cycle of active LED segments of the light assembly 70 increases in 20% increments. In this manner, when the core 50 is in a first position, the duty cycle of all active LEDs is 20%, when the core 50 is in a second position, the duty cycle of all active LEDs is 40%, and so on until the duty cycle of all active LEDs is 100%.

In one aspect, the housing 53 comprises a first conical section 54 and second conical section 57 arranged in an opposing relationship to the first conical section 54, such that a bottom 55 of the first conical section 54 is disposed about a top 51 of the core 50 and a bottom 58 of the second conical section 57 is disposed about the bottom 52 of the core 50. The light assembly 70 is disposed between the top 56 of the first conical section 54 and the top 59 of the second conical section 57. While conical sections are described, it is understood that in one aspect of the technology the housing comprises one or more cylindrical sections disposed between the top 51 and bottom 52 of the core 50 with the light assembly 70 disposed above, below, or between the cylindrical sections. The sections (conical, cylindrical, or other shaped) function generally as a support for the light assembly 70. In another aspect, the light assembly 70 is disposed between the top 51 and bottom 52 and is itself cylindrical and is the only component between the top 51 and bottom 52 of the core 50. Moreover, in another aspect of the technology, the core 50 comprises only a top 51 or bottom 52 coupled to the light assembly 70.

In one aspect of the technology, the support for the light assembly comprises a reflective material or coating disposed about the support. The reflective material on conical sections 54 and 57, for example, assist in creating a conical annular reflective surface. In another aspect of the technology, the support comprises one or more slots 60 disposed horizontally about the support. In another aspect, the slots 60 are disposed in a vertical or angular orientation with respect to the longitudinal axis of the core 50. In one aspect of the technology, the slots 56 reduce the amount of material required to manufacture the device and also the weight of the device. In addition, however, the slots 56 facilitate air flow to assist in dissipation of heat created by the light assembly 70.

In another aspect of the technology, the conical sections 54 and 57 comprise one or more LEDs arranged in the same horizontal grouping and/or vertical grouping described herein with respect to light assembly 70. In this aspect, the lighting assembly 70 is not cylindrical but conical to conform to the shape of the conical sections 54 and 57. The operation of the horizontal grouping and/or vertical grouping on the conical sections would be similar to that as described with respect to light assembly 70. As with the light assembly 70, conical section(s) may have a plurality of LEDs (or other light sources) configured to propagate light at a variety of different wavelengths, different maximum lumen outputs, different brightness levels, different color corrected temperature (CCT), and the like. Different sections may have a higher density of LEDs disposed thereon or with a variety of different LED specifications as noted herein.

In one aspect of the technology, the top 51 and/or bottom 52 comprise a cavity with a battery disposed therein and a PLC configured to activate one or more LEDs of the light assembly 70. The battery may be a disposable battery or a rechargeable battery as suits a particular application. In another aspect of the technology, the core 50 comprises one or more tabs 49 that are configured to fit between two adjacent arms 23 of the frame 20. In another aspect, the bottom 52 of the core 50 comprises a tapered edge 54 that is configured to be seated within a corresponding tapered section 25 of a bottom 22 of frame 20. In another aspect, a strap 90 is coupled to a top 51 portion of the core 50 on a first end of the strap 90 and coupled to a bottom of the frame 20 on a second end of the strap 90. The length of the strap 90 is configured to extend from a top 51 of the core 50 to a bottom of the frame 20 when the core 50 is fully extended or in its fully extended state. In this manner, the strap 90 helps prevent the core 50 from being overextended out of the frame 20.

In one aspect, the tab 49 has a width that is substantially the same as the width of the space between adjacent arms 23 of frame 20. The tab 49 fits within the adjacent arms 23 and provides additional support and stability for the core 50 as it slides up and/or down within the frame 20. In one aspect, the tab 49 is depressible such that it is moveable within a void in the core 50 allowing the entire core 50 to be rotated. The tab 49 is biased in an outward position so that when the core 50 is rotated and the tab 49 is radially oriented to another opening between other adjacent arms 23 of the frame 20, the tab 49 will pop out of the void in the core 50 and lock the radial movement of the core 50 in place. In one aspect of the technology, the tab 49 limits the upward and downward (or longitudinal) movement of the core 50 within the frame 20 as the tab 49 interfaces with a bottom portion 22 or top portion 21 of the frame 20.

In another aspect of the technology, the light assembly 70 comprises a spotlight disposed about a distal or proximal end of the assembly 70. In another aspect, a separate spotlight is disposed about a top or bottom of the device 10 and operates as a light source separate and apart from the light assembly 70. In one aspect, the rotating and longitudinal movement of the core 50 with respect to the frame 20 have no effect on the operation of the spotlight. However, in another aspect, the radial movement of the core 50 and/or the longitudinal movement of the core 50 with respect to the frame is coupled to operational characteristics of the light assembly 70. In one aspect, as the core 50 is moved relative to the frame 20, the spotlight is activated while the flood or area light from the light assembly 70 is deactivated. In yet another aspect, the spotlight comprises an annular area (or flood) light propagating light in the same direction as the spotlight. The radial and/or longitudinal movement of the core 50 with respect to the frame changes the operational status and/or light output from the spotlight and/or the annular area or flood light.

In one aspect of the technology, the PLC is configured to regulate the pulse-width-modulation (or PWM) of one or more LEDs at a plurality of different duty cycles in a plurality of different preset sequences that are activated by one or more sensors. In one aspect, light emission from the LED is controlled by pulses wherein the width of these pulses is modulated to control the amount of light perceived by the user of the lighting device. When the full direct current voltage runs through an LED, the maximum of light is emitted 100% of the time. That is, the LED emits light 100% of the time when in an "ON" mode. With PWM, the voltage supplied to the LED can be "ON" 50% of the time and "OFF" 50% of the time so that the LED gives off its maximum amount of light only 50% of the time. This is referred to as a 50% duty cycle. In this scenario, if the ON-OFF cycle is modulated fast enough, human eyes will perceive only half the amount of light coming from the LED. That is, with such an input on the LED, the amount of light given off appears diminished by 50%. While specific reference is made to a 50% duty cycle, the LED duty cycle of the light sources described herein may be greater or lesser than 50% as suits a particular purpose. In one aspect, the PLC, power source, control switch, and different light sources are all operably coupled together.

In one aspect of the technology, different light sequencing modes of a lighting device programmed into the PLC. In one aspect of the technology, the PWM for the HIGH, MEDIUM1, MEDIUM2, and LOW modes (or first, second, third, and fourth power modes) is set at a duty cycle of about 80%, 60%, 40%, and 20%, respectively, though other duty cycles may be used. In one aspect, the duty cycle for a first power mode ranges from about 70% to about 80%, a second power mode ranges from about 50% to about 60%, a third power mode ranges from about 30% to about 40%, and a fourth power mode ranges from about 10% to about 20%.

In one aspect of the technology, the arms 23 of the frame 20 comprise markings that correspond to the location of the magnet(s) associated with the sensors for actuating light assembly 70. For example, in the aspect where the lighting device 10 comprises a HIGH, MEDIUM1, MEDIUM2, and LOW modes of operation, the arms 23 have corresponding markings. Each of those markings are disposed proximate to the area where the magnet(s) in the arms are located. Likewise, a top of the frame 20 comprises markings associated with one or more magnets in the frame 20 such that as the core 50 is rotated (or moved laterally or radially with respect to the frame 20), the light assembly 70 is activated as the core 50 moves to corresponding marks.

The foregoing detailed description describes the technology with reference to specific exemplary aspects. However, it will be appreciated that various modifications and changes can be made without departing from the scope of the present technology as set forth in the appended claims. The detailed description and accompanying drawing are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A hand-held lighting device, comprising:

a frame having an internal volume configured to house a core therein, the frame comprising a top, a bottom, and a plurality of arms, the plurality of arms connecting the top of the frame to the bottom of the frame;

wherein the top comprises an opening for slidably receiving the core therein;

a core slidably disposed within the frame, the core comprising a top, a bottom, and a lighting assembly disposed between the top and bottom of the core;

wherein the lighting assembly comprises a plurality of light sources that are configured to selectively activate as the core is slidably moved with respect to the frame in a longitudinal direction and as the core is rotated with respect to the frame.

2. The lighting device of claim 1, further comprising a sensor assembly configured to detect longitudinal movement of the core within the frame and to increase the light output from the light assembly as the core is slidably removed from the frame and decrease the light output from the light assembly as the core is slidably placed within the frame.

3. The lighting device of claim 1, wherein the lighting assembly comprises a plurality of radial segments each comprising a plurality of light sources, wherein the light sources in the radial segments are selectively activatable as the core is rotate within the frame.

4. The lighting device of claim 1, wherein the lighting assembly comprises a plurality of vertical segments each comprising a plurality of light sources, wherein the light sources in the vertical segments are selectively activatable as the core is longitudinally moved within the frame.

5. The lighting device of claim 1, wherein the bottom of the core is configured to mate with the bottom of the frame when the core is fully disposed within the frame.

6. The lighting device of claim 1, wherein the top of the core is configured to mate with the top of the frame when the core is fully disposed within the frame.

7. The lighting device of claim 1, further comprising a strap coupled to a top of the core and the bottom of the frame.

8. The lighting device of claim 1, wherein the plurality of arms comprises a plurality of longitudinal arms extending from a top of the frame to a bottom of the frame in a longitudinal direction of the frame and wherein adjacent ones of the plurality of arms are separated by an opening into an internal volume of the frame.

9. A hand-held lighting device comprising:

a frame having an internal volume configured to house a core therein, the frame comprising a top, a bottom, and a plurality of pairs of arms extending longitudinally between the top of the frame and the bottom of the frame, each pair of the plurality of arms defining an opening through the frame into the internal volume of the frame;

wherein the frame comprises an opening for slidably receiving the core therein in a longitudinal direction;

a core slidably disposed within the frame, the core comprising a top, a bottom, and a lighting assembly disposed between the top and bottom of the core;

a sensor assembly coupled to the core and the frame;

wherein the lighting assembly comprises a plurality of light sources that are configured to (i) selectively increase light output in along a longitudinal direction of the light assembly as the core is slidably moved with respect to the frame in a longitudinal direction and (ii) selectively increase light out put in a radial direction of the light assembly as the core is rotated with respect to the frame.

10. The hand-held lighting device of claim 9, wherein the lighting assembly comprises first and second opposing conical sections disposed between the top and bottom of the core.

11. The lighting device of claim 9, wherein the plurality of arms are translucent or transparent.

12. The lighting device of claim 9, wherein the bottom of the core comprises a tab configured to mate with an opening between one of the pairs of the plurality of arms, said tab limiting the radial and longitudinal movement of the core within the frame.

13. The lighting device of claim 9, wherein the sensor assembly is configured to detect longitudinal movement of the core within the frame and radial movement of the core within the frame.

14. A method of operating a hand-held lighting device, comprising:

using a lighting device to propagate light, the lighting device comprising a core disposed within a frame, the core comprising a lighting assembly increasing the amount of light propagated by the lighting assembly along a longitudinal direction of the core by sliding the core of the lighting device out of a frame;

increasing the amount of light propagated by the lighting assembly in a first radial direction of the core by rotating the core within the frame in the first radial direction.

15. The method of claim 14, further comprising:

decreasing the amount of light propagated by the lighting assembly in a longitudinal direction by sliding the core of the lighting device into the frame;

decreasing the amount of light propagated by the lighting assembly in a radial direction by rotating the core within the frame in a second radial direction, the second radial direction being opposite the first radial direction.

16. The method of claim 15, wherein the lighting assembly comprises a sensor assembly operatively coupled to the core and the frame and configured to detect (i) longitudinal movement of the core into and out of the frame and (ii) rotation of the core within the frame.

17. The method of claim 14, wherein increasing the amount of light propagated by the lighting assembly in the longitudinal direction of the core comprises increasing the duty cycle of the light sources, increasing the voltage provided to the light sources, or increasing the number of light sources propagating light.

18. The method of claim 14, wherein increasing the amount of light propagated by the lighting assembly in the radial direction of the core comprises increasing the duty cycle of the light sources, increasing the voltage provided to the light sources, or increasing the number of light sources propagating light.

19. The method of claim 15, wherein decreasing the amount of light propagated by the lighting assembly in the longitudinal direction of the core comprises decreasing the duty cycle of the light sources, decreasing the voltage provided to the light sources, or decreasing the number of light sources propagating light.

20. The method of claim 15, wherein decreasing the amount of light propagated by the lighting assembly in the radial direction of the core comprises decreasing the duty cycle of the light sources, decreasing the voltage provided to the light sources, or decreasing the number of light sources propagating light.

* * * * *